(12) United States Patent
Vasquez et al.

(10) Patent No.: US 12,130,821 B1
(45) Date of Patent: Oct. 29, 2024

(54) CONTAINERIZED DATA CLASSIFICATION AND AUTOMATED METADATA PUBLISHING SYSTEM

(71) Applicants: Ernest Vasquez, San Antonio, TX (US); Ernest Matthew Vasquez, Fair Oaks Ranch, TX (US); Joshua Andres Vasquez, San Antonio, TX (US)

(72) Inventors: Ernest Vasquez, San Antonio, TX (US); Ernest Matthew Vasquez, Fair Oaks Ranch, TX (US); Joshua Andres Vasquez, San Antonio, TX (US)

(73) Assignee: Mundo Systems Inc., San Antonio, TX (US)

(*) Notice: Subject to any disclaimer, the term of this patent is extended or adjusted under 35 U.S.C. 154(b) by 0 days.

(21) Appl. No.: 18/748,116

(22) Filed: Jun. 20, 2024

Related U.S. Application Data (60) Provisional application No. 63/523,012, filed on Jun. 23, 2023.

(51) Int. Cl.
*G06F 16/00* (2019.01)
*G06F 16/2457* (2019.01)
*G06F 16/28* (2019.01)
*G06F 40/55* (2020.01)

(52) U.S. Cl.
CPC ...... *G06F 16/24573* (2019.01); *G06F 16/285* (2019.01); *G06F 40/55* (2020.01)

(58) Field of Classification Search
CPC ... G06F 16/24573; G06F 16/285; G06F 40/55
See application file for complete search history.

(56) References Cited

U.S. PATENT DOCUMENTS

2019/0370386 A1* 12/2019 Brandwine ........... G06F 3/0604
2023/0418859 A1* 12/2023 Park ..................... G06F 40/221

OTHER PUBLICATIONS

Anagnostopoulos et al., "Effective and Efficient Classification on a Search-Engine Model," ACM, CIKM'06, Nov. 5-11, 2006, pp. 208-217. (Year: 2006).*
Wang et al., "Pre-Trained Language Models and Their Applications," Elsevier, journal homepage: www.elsevier.com/locate/eng, ScienceDirect, pp. 51-55. (Year: 2022).*

* cited by examiner

*Primary Examiner* — Cheryl Lewis
(74) *Attorney, Agent, or Firm* — Plager Schack LLP; Mark H. Plager, Esq.; Stephen Hallberg, Esq.

(57) ABSTRACT

A containerized data classification and automated metadata publishing system (DCAMPS-C) is disclosed. DCAMPS-C is powered by a data classification engine. The containerized data classification and automated metadata publishing system hosts a data classification and automated metadata cloud application publishing service. DCAMPS-C offers a containerized solution that automates the data classification and metadata generation processes, eliminates the need for manual input, reduces the chances of human error, and ensures seamless integration with modern cloud and on-premise infrastructures for better resource utilization, scalability, and overall efficiency in managing digital content within an organization.

15 Claims, 3 Drawing Sheets

CONTAINERIZED DATA CLASSIFICATION AND AUTOMATED METADATA PUBLISHING SYSTEM

CLAIM OF BENEFIT TO PRIOR APPLICATION

This application claims benefit to U.S. Provisional Patent Application 63/523,012, entitled "A CONTAINERIZED DATA CLASSIFICATION AND AUTOMATED METADATA PUBLISHING SYSTEM," filed Jun. 23, 2023. The U.S. Provisional Patent Application 63/523,012 is incorporated herein by reference.

BACKGROUND

Embodiments of the invention described in this specification relate generally to data classification and automated metadata publishing, and more particularly, to a containerized data classification and automated metadata publishing system.

In the field of data classification and automated metadata publishing, many of the existing systems and applications manage digital assets and content inefficiently. This often leads to problematic results such as compliance issues, security risks, and difficulty in locating and organizing sensitive information within an organization's data environment.

Also, many of the existing systems and applications in the field suffer from other drawbacks. Specifically, some of the existing options are platform-dependent, which is too rigid in many scenarios. Also, many of the existing systems and applications require manual input for metadata generation. Typically, the existing systems and applications lack efficient integration with modern infrastructures, which can lead to inconsistencies and increased complexity in managing digital assets and content.

Consequently, there is a need for a containerized solution that addresses the challenges of efficiently managing digital assets and content within an information technology environment of an organization, seamlessly integrating data classification, metadata generation, and containerized technologies, thereby streamlining the processes of identifying, categorizing, and organizing sensitive information, while ensuring compliance with data protection regulations and mitigating potential security risks.

BRIEF DESCRIPTION

A novel containerized data classification and automated metadata publishing system (hereinafter referred to as the "DCAMPS-C system" or simply as "DCAMPS-C") and a DCAMPS-C deployment, configuration, and runtime process are disclosed that streamlines the processes of identifying, categorizing, and organizing sensitive information for an organization, ensures compliance with data protection regulations, and mitigates potential security risks by seamlessly integrating data classification, metadata generation, and containerization technologies. In some embodiments, DCAMPS-C includes a containerization architecture that is based on containerization technology and is configured to create a consistent and isolated environment for runtime execution.

In some embodiments, the DCAMPS-C system comprises (i) a data classification engine capable of accurately classifying and categorizing data based on classification rules and policies that provide flexibility and accuracy in data classification for data of an organization, wherein the data classification engine is further configured to classify the data ("classified data") and generate metadata for the classified data, (ii) a data source integration that is configured to allow the data classification engine to scan and classify data across a plurality of data sources of the organization, (iii) an automated metadata publishing service that is configured to receive the classified data and generated metadata from the data classification engine and perform a metadata enrichment process to add the metadata to the digital assets and content of the organization, a "your optimized learning artificial-intelligence generative pre-trained transformer" (YOLAGPT) large language model (LLM) module that is configured to provide seamless interpretation of natural language inputs and classification of data assets and content, and a DCAMPS-C container deployed at the organization to manage sensitive data and information in an information technology (IT) environment of the organization, wherein the DCAMPS-C container provides a consistent and isolated environment for runtime execution by encapsulating the data classification engine, the data source integration, the automated metadata publishing service. In some embodiments, the YOLAGPT LLM module provides seamless interpretation of natural language inputs and classification of data assets and content by (i) interpreting natural language inputs, (ii) translating the interpreted natural language input into formal rules, (iii) integrating the translated formal rules into the data classification engine, and (iv) scanning and classifying data assets and content across the data sources of the organization based on the classification rules. In some embodiments, the DCAMPS-C system further comprises runtime program components comprising program code (software), runtime executables, system tools, libraries, and settings that provide integral components for runtime operation as a standalone, executable package for a single instance of the DCAMPS-C container. In some embodiments, the DCAMPS-C system fully supports all organization DevOps and offers cloud-native infrastructure integration to enable seamless deployment, scaling, and management of data assets and content for the organization. In some embodiments, the DCAMPS-C system further comprises a DCAMPS orchestrator that is configured to manage deployment of the DCAMPS-C container and scaling of the components encapsulated in the deployed DCAMPS-C container. In some embodiments, the DCAMPS system is designed according to a containerization architecture, based on containerization technology, which creates a consistent and isolated environment for runtime execution.

In some embodiments, DCAMPS-C is powered by Netwrix Data Classification software (hereinafter referred to as "Netwrix"), which provides the data classification engine (hereinafter referred to as the "Netwrix data classification engine"). In some embodiments, the data classification engine comprises a different data classification engine capable of accurately classifying and categorizing data based on customizable rules and policies.

In some embodiments, the DCAMPS-C system hosts a containerized data classification and automated metadata cloud application publishing service for automated metadata publishing (hereinafter referred to as the "DCAMPS-C automated metadata publishing service" or, simply, the "automated metadata publishing service"). In some embodiments, the automated metadata publishing service provides advanced data management techniques and is configured to perform a metadata enrichment process to further enhance the data management capabilities provided by DCAMPS-C.

In some embodiments, DCAMPS-C encapsulates all software (program code and executables), system tools, libraries, and settings via containerization technology within a containerized architecture. Specifically, the containerization technology encapsulates the data classification engine, the automated metadata publishing service, the software executable and program code, system tools, libraries, and settings to provide a consistent and isolated environment for runtime execution. In some embodiments, DCAMPS-C supports full data source integration. The data source integration provides access to a wide range of data sources such as file servers, databases, SharePoint, and web sources, among others. Overall, the containerization architecture enables efficient resource utilization, scalability, and streamlined management across these different platforms and environments for any organization at which DCAMPS-C is deployed and utilized for the management of digital content.

In some embodiments, DCAMPS-C is integrated with a custom large language model (LLM) module. In some embodiments, the custom LLM module is configured for optimized learning through artificial intelligence (AI) by way of a generative pre-trained transformer (GPT) (collectively referred to as the "your optimized learning artificial-intelligence generative pre-trained transformer (YOLAGPT) large language model (LLM) module", the "YOLAGPT LLM module", or, simply, "YOLAGPT"). In some embodiments, the YOLAGPT LLM module leverages state-of-the-art natural language processing (NLP) techniques and advanced language models, thereby enabling natural language input (by end users) for defining and managing classification rules. In this way, the integration of the YOLAGPT into the DCAMPS-C system introduces a suite of powerful features that enhance the data classification, metadata generation, and content organization functionalities of DCAMPS-C, and eliminates the need for technical expertise or manual effort in rule creation. Additionally, the integration of YOLAGPT into DCAMPS-C allows for the enrichment of existing metadata tags and classifications with additional contextual information, synonyms, related concepts, and hierarchical relationships, thereby improving the semantic richness and discoverability of digital assets. In this way, DCAMPS-C, via the YOLAGPT integration, provides functionality for advanced content analysis and knowledge extraction from the classified data. These capabilities and functions can be leveraged across various components of DCAMPS-C, further enhancing the overall data management and content organization processes within an information technology (IT) environment of the organization.

In some embodiments, the YOLAGPT integration provides access to Retrieval Augmented Generation (RAG) which is configured to allow a DCAMPS-C container to combine information retrieval and language generation to produce more accurate and comprehensive metadata by effectively retrieving and synthesizing relevant information from a curated knowledge base.

In some embodiments, the DCAMPS-C deployment, configuration, and runtime process is performed in parts by (i) a deployment and configuration agent (or, simply, "deployment agent") configuring and deploying a DCAMPS-C container at an organization, (ii) the YOLAGPT LLM module, and (iii) an automated metadata publishing service. As such, the DCAMPS-C deployment, configuration, and runtime process is also referred to as the "DCAMPS-C and YOLAGPT LLM module deployment, configuration, and runtime process".

In some embodiments, the DCAMPS-C and YOLAGPT LLM module deployment, configuration, and runtime process comprises (i) preparing for a DCAMPS-C runtime process, (ii) deploying a DCAMPS-C container at an organization, (iii) configuring a data source integration for access to a plurality of data sources of the organization, (iv) establishing authentication and access protocols, (v) defining data source connectors that enable access to the plurality of data sources, (vi) defining classification rules and policies via natural language input, (vii) integrating a YOLAGPT large language model (LLM) module into the DCAMPS-C container, (viii) interpreting, by the YOLAGPT LLM module, the natural language input and translating the interpreted natural language input into formal rules, (ix) scanning and classifying, by the YOLAGPT LLM module, data sources based on the defined classification rules, (x) integrating, by the YOLAGPT LLM module, the translated formal rules into a data classification engine (where the data classification engine is the Netwrix data classification engine), (xi) triggering, by the YOLAGPT LLM module, an automated metadata publishing service that is configured to perform a metadata enrichment process, (xii) combining information retrieval and language generation, via retrieval augmented generation (RAG) accessed by the YOLAGPT LLM module, to produce accurate and comprehensive metadata by effectively retrieving and synthesizing relevant information from a curated knowledge base, (xiii) generating, by the automated metadata publishing service performing the metadata enrichment process, enriched metadata for digital assets and content of the organization, (xiv) monitoring, by the DCAMPS-C container, classification results and updating rules and policies as needed, and (xv) continuously improving model accuracy through a feedback loop.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having thus described the invention in general terms, reference is now made to the accompanying drawings, which are not necessarily drawn to scale, and which show different views of different example embodiments.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

As used herein, the terms "comprises," "comprising," "includes," "including" and/or any other variation thereof, are intended to cover a non-exclusive inclusion, such that an article, apparatus, and/or component does not include only those elements but can include other elements not expressly listed and/or inherent to such article, apparatus, and/or component. It must also be noted that, as used in this specification and the appended claims, the singular forms "a," "an" and "the" include plural referents unless the content clearly dictates otherwise.

Unless defined otherwise, all technical terms used herein have the same meaning as commonly understood by one of ordinary skill in the art to which the disclosure pertains. Although a number of modules, programs, tools, hardware devices, machines, methods, and/or materials similar or equivalent to those described herein can be used in the practice of the present disclosure, certain preferred modules, programs, tools, hardware devices, machines, methods, and materials are described herein.

The terms "encapsulated" is used in this disclosure and is understood to have similar meaning to similar terms, such as "embedded", "attached," and the like. Thus, the term "encapsulated", when used in the description and in the claims, if at all, is used for descriptive purposes and not necessarily for describing permanent relative positions or manners of inclusion with respect to any given deployment of a containerized data classification and automated metadata publishing system and/or its associated tools, modules, programs, etc. For instance, many of the forthcoming descriptions refer to encapsulated modules, services, engines, and the like, which are incorporated into a containerized instance of the containerized data classification and automated metadata publishing system (often referred to below as a "DCAMPS-C container"), the position of which is shown in the drawings, but is not intended to limit an understanding of encapsulated positioning of these modules, services, and/or engines within the DCAMPS-C container or relative positioning when "attached" to and/or communicably connected to the DCAMPS-C container. Thus, it may be understood that the relative positioning shown in the drawings is exemplary and is not intended to limit such placement to only the illustrated positioning. Also, with respect to the "encapsulated" terminology used, it is understood that similar terms such as "embedded," "included," and "attached", among other similar terminology, are interchangeable under appropriate circumstances such that the embodiments described herein are, for example, capable of incorporation of the noted components in other orientations and/or relational placements than those illustrated or otherwise described herein.

Also, the terms "plug-in," "integrated into," "incorporated," and the like should be broadly understood and refer to the joining together of functional encoded software programs, modules, services, engines, and the like, that perform machine-encoded instructions on a computing device for software implementations that are incorporated as native code into a program or joined together with other software programs or applications.

Embodiments of the invention described in this specification provide a containerized data classification and automated metadata publishing system (DCAMPS-C) that is configured to streamline the processes of identifying, categorizing, and organizing sensitive information for an organization, ensure compliance with data protection regulations, and mitigate potential security risks by seamlessly integrating data classification, metadata generation, and containerization technologies via a containerization architecture that is configured to create a consistent and isolated environment for runtime execution.

In some embodiments, the DCAMPS-C system comprises (i) a data classification engine capable of accurately classifying and categorizing data based on classification rules and policies that provide flexibility and accuracy in data classification for data of an organization, wherein the data classification engine is further configured to classify the data ("classified data") and generate metadata for the classified data, (ii) a data source integration that is configured to allow the data classification engine to scan and classify data across a plurality of data sources of the organization, (iii) an automated metadata publishing service that is configured to receive the classified data and generated metadata from the data classification engine and perform a metadata enrichment process to add the metadata to the digital assets and content of the organization, a "your optimized learning artificial-intelligence generative pre-trained transformer" (YOLAGPT) large language model (LLM) module that is configured to provide seamless interpretation of natural language inputs and classification of data assets and content, and a DCAMPS-C container deployed at the organization to manage sensitive data and information in an information technology (IT) environment of the organization, wherein the DCAMPS-C container provides a consistent and isolated environment for runtime execution by encapsulating the data classification engine, the data source integration, the automated metadata publishing service. In some embodiments, the YOLAGPT LLM module provides seamless interpretation of natural language inputs and classification of data assets and content by (i) interpreting natural language inputs, (ii) translating the interpreted natural language input into formal rules, (iii) integrating the translated formal rules into the data classification engine, and (iv) scanning and classifying data assets and content across the data sources of the organization based on the classification rules. In some embodiments, the DCAMPS-C system further comprises runtime program components comprising program code (software), runtime executables, plug-in components, system tools, libraries, and settings that provide integral components for runtime operation as a standalone, executable package for a single instance of the DCAMPS-C container. In some embodiments, the DCAMPS-C system fully supports all organization DevOps and offers cloud-native infrastructure integration to enable seamless deployment, scaling, and management of data assets and content for the organization. In some embodiments, the DCAMPS-C system further comprises a DCAMPS orchestrator that is configured to manage deployment of the DCAMPS-C container and scaling of the components encapsulated in the deployed DCAMPS-C container. In some embodiments, the DCAMPS system is designed according to a containerization architecture, based on containerization technology, which creates a consistent and isolated environment for runtime execution.

In some embodiments, DCAMPS-C is powered by Netwrix, which provides the Netwrix data classification engine. In some embodiments, DCAMPS-C leverages the Netwrix data classification engine to ensure accurate identification and categorization of sensitive information. Specifically, the Netwrix data classification engine is configured to automatically scan data sources accessible to the organization, locate data, and classify data based on predefined or custom classification rules. Examples of data sources accessible to the organization include, without limitation, data sources of the organization and data sources used by the organization, such as file servers, SharePoint, web sources, and cloud storage. By utilizing the Netwrix data classification engine to ensure accurate identification and categorization of sensitive information, DCAMPS-C enables organizations to effectively manage their data assets.

In some embodiments, the data classification engine comprises a different data classification engine capable of accurately classifying and categorizing data based on customizable rules and policies.

In some embodiments, the DCAMPS-C system hosts the DCAMPS-C automated metadata publishing service. In some embodiments, the automated metadata publishing service employs a plurality of advanced data management techniques to further enhance the data management capabilities provided by DCAMPS-C. In some embodiments, the plurality of advanced data management techniques comprise at least artificial intelligence (AI), machine learning (ML), and predefined rules configuration and utilization. In some embodiments, one or more of the advanced data management techniques are used by the automated metadata publishing service for a metadata enrichment process that involves analyzing content and generating relevant metadata for digital assets. This metadata enrichment process significantly improves the ability to search, discover, and organize the digital content of the organization.

In some embodiments, DCAMPS-C encapsulates all software (code and runtime executables, scripts, and/or program modules), system tools, libraries, and settings via containerization technology within a containerized architecture. Specifically, the containerization technology encapsulates the data classification engine, the automated metadata publishing service, the software executables and program code, system tools, libraries, and settings to provide a consistent and isolated environment for runtime execution. The encapsulation of components within the containerized architecture ensures that DCAMPS-C is provided in a lightweight (small footprint) and portable deployment package. In some embodiments, the containerization architecture (also referred to as the "containerized architecture" or the "container architecture") ensures consistent deployment and seamless integration with a wide range of platforms and environments, which typically involve modern DevOps practices and cloud-native infrastructures, among other practices. In some embodiments, DCAMPS-C supports full data source integration. The data source integration provides access to a plurality of data sources. Examples of such data sources include, without limitation, one or more file servers, databases, SharePoint, and web sources. Overall, the containerization architecture enables efficient resource utilization, scalability, and streamlined management across these different platforms and environments for any organization at which DCAMPS-C is deployed and utilized for the management of digital content.

In some embodiments, DCAMPS-C is integrated with a custom LLM module. In some embodiments, the custom LLM module is configured for optimized learning through AI by way of a GPT (hereinafter referred to as YOLAGPT).

In some embodiments, YOLAGPT leverages state-of-the-art NLP techniques and advanced language models, thereby enabling natural language input (by end users) for defining and managing classification rules. In this way, the integration of the YOLAGPT LLM module into DCAMPS-C introduces a suite of powerful features that enhance the data classification, metadata generation, and content organization functionalities of DCAMPS-C, and eliminates the need for technical expertise or manual effort in rule creation because YOLAGPT interprets and translates natural language inputs into formal classification rules, which are seamlessly incorporated into the Netwrix data classification engine, ensuring accurate and efficient data categorization tailored to specific needs of the organization.

In some embodiments, the integration of YOLAGPT into DCAMPS-C provides access to RAG (that is, retrieval augmented generation). RAG is a feature that combines information retrieval and language generation to produce more accurate and comprehensive metadata by effectively retrieving and synthesizing relevant information from a curated knowledge base. In some embodiments, YOLAGPT is also configured to enrich existing metadata tags and classifications with additional contextual information, synonyms, related concepts, and hierarchical relationships, improving the semantic richness and discoverability of digital assets.

Furthermore, the integration of YOLAGPT into DCAMPS-C introduces supplementary LLM capabilities, such as summarizing of text, answering of questions, and generation of content. In this way, DCAMPS-C, via the YOLAGPT integration, provides functionality for advanced content analysis and knowledge extraction from the classified data. These capabilities and functions can be leveraged across various components of DCAMPS-C, further enhancing the overall data management and content organization processes within an IT environment of the organization.

In some embodiments, the DCAMPS-C and YOLAGPT LLM module deployment, configuration, and runtime process comprises (i) preparing for a DCAMPS-C runtime process, (ii) deploying a DCAMPS-C container at an organization, (iii) configuring a data source integration for access to a plurality of data sources of the organization, (iv) establishing authentication and access protocols, (v) defining data source connectors that enable access to the plurality of data sources, (vi) defining classification rules and policies via natural language input, (vii) integrating a YOLAGPT large language model (LLM) module into the DCAMPS-C container, (viii) interpreting, by the YOLAGPT LLM module, the natural language input and translating the interpreted natural language input into formal rules, (ix) scanning and classifying, by the YOLAGPT LLM module, data sources based on the defined classification rules, (x) integrating, by the YOLAGPT LLM module, the translated formal rules into a data classification engine (where the data classification engine is the Netwrix data classification engine), (xi) triggering, by the YOLAGPT LLM module, an automated metadata publishing service that is configured to perform a metadata enrichment process, (xii) combining information retrieval and language generation, via retrieval augmented generation (RAG) accessed by the YOLAGPT LLM module, to produce accurate and comprehensive metadata by effectively retrieving and synthesizing relevant information from a curated knowledge base, (xiii) generating, by the automated metadata publishing service performing the metadata enrichment process, enriched metadata for digital assets and content of the organization, (xiv) monitoring, by the DCAMPS-C container, classification results and updating rules and policies as needed, and (xv) continuously improving model accuracy through a feedback loop.

As stated above, there are many existing inefficient and/or problematic data classification and automated metadata publishing systems and applications that leave organizations with problematic outcomes such as compliance issues, security risks, and difficulty in locating and organizing sensitive information within the organization's data environment. Some of the existing systems and applications have other or additional problems, namely, being a platform-dependent solution, which limits an organization's ability to tackle their (possibly) wide range data requirements. Other existing systems and applications require manual input for metadata generation and most lack efficient integration with modern infrastructures, which can lead to inconsistencies and increased complexity in managing digital assets and content. Embodiments of the DCAMPS-C system with YOLAGPT integration solve such problems by combining the power of data classification, automated metadata generation, containerization, and advanced language models that simplifies deployment, scaling, and management of the data classification and metadata publishing processes. In this way, DCAMPS-C with YOLAGPT integration automates the data classification and metadata generation processes, eliminates the need for manual input, reduces the chances of human error, and ensures seamless integration with modern cloud and on-premise infrastructures for better resource utilization, scalability, and overall efficiency in managing digital content within an organization. As such, organizations are able to efficiently manage their digital assets, ensure compliance, mitigate security risks, and unlock the full potential of their digital content.

Embodiments of the DCAMPS-C system described in this specification differ from and improve upon currently existing options. In particular, existing systems and applications in the field which rely on manual processes, are prone to human error, and are not optimized for efficient resource utilization, scalability, and integration with modern IT environments. By contrast, the DCAMPS-C system provides a containerized solution that automates the process for data classification and metadata generation processes, eliminates the need for manual input, reduces the chances of human error, and ensures seamless integration with modern cloud and on-premise infrastructures for better resource utilization, scalability, and overall efficiency in managing digital content within an organization. In some embodiments, several components of a DCAMPS-C container are implemented in software. In some embodiments, a DCAMPS-C container is a lightweight, standalone, and containerized instance that is ready for seamlessly integrating with modern DevOps practices and cloud-native infrastructures of any organization. In this way, DCAMPS-C ensures consistency across different platforms and deployment environments while enhancing resource utilization, scalability, and efficiency in managing digital assets and content.

The DCAMPS-C system of the present disclosure may be comprised of the following elements. This list of possible constituent elements is intended to be exemplary only and it is not intended that this list be used to limit DCAMPS-C to just these elements. Persons having ordinary skill in the art relevant to the present disclosure may understand there to be equivalent elements that may be substituted within the present disclosure without changing the essential function or operation of DCAMPS-C.

1. Containerization Technology: The core component that encapsulates the data classification and automated metadata publishing software, ensuring consistency, resource utilization, and simplified deployment across different platforms and environments.
2. A Data Classification Engine (in some embodiments, a Netwrix Data Classification Engine): The data classification engine is designed to identify, categorize, and manage sensitive information and data within an organization's IT environment.
3. Automated Metadata Publishing Service: A service that uses AI, machine learning, or pre-defined rules to analyze content and generate relevant metadata for digital assets, improving searchability and discoverability.
4. Customizable Classification Rules and Policies: A set of predefined or user-defined rules and policies to accurately classify and categorize data based on content and metadata.
5. Data Source Integration: The ability to scan and classify data from various sources, such as file servers, databases, SharePoint, and Web sources.
6. Code, Runtime, System Tools, Libraries, and Settings: All the necessary components included within the container to ensure that the DCAMPS-C container can run as a standalone, executable package.
7. DevOps and Cloud-Native Infrastructure Integration: Seamless integration with modern IT practices and infrastructures for efficient deployment and management of the system.
8. ADCAMPS-C Orchestrator: Provides deployment management and scaling oversight for all encapsulated components.
9. An Automated Metadata Publishing Service: Simplifies and streamlines the process of adding metadata to data assets and content. Uses artificial intelligence (AI) and machine learning (ML) to optimize metadata generation for data assets and content.
10. A Generative Pre-Training Transformer Large Language Model (LLM) module: Referred to as YOLAGPT LLM module, provides large language model capabilities to DCAMPS-C containers deployed for organizations.

The various elements of the DCAMPS-C system of the present disclosure may be related in the following exemplary fashion. It is not intended to limit the scope or nature of the relationships between the various elements and the following examples are presented as illustrative examples only. The containerization technology encapsulates all other components, including the data classification engine (Netwrix Data Classification Engine in some embodiments), the automated metadata publishing service, and the code, runtime, system tools, libraries, and settings, to provide a consistent and isolated environment for running the DCAMPS-C container after deployment. The data classification engine (or Netwrix Data Classification engine) uses the customizable classification rules and policies to accurately classify and categorize data from one or more data source integration. Examples of data source integration include, without limitation, file servers, databases, SharePoint servers, web sources, and cloud storage resources/providers. The automated metadata publishing service works in conjunction with the data classification engine (or Netwrix Data Classification engine) to analyze content based on the classification rules and generate relevant metadata for digital assets. The customizable classification rules and policies provide flexibility and accuracy in data classification based on the specific needs and requirements of an organization. The data source integration allows the data classification engine (or Netwrix Data Classification engine) to scan and classify data from a wide range of sources, improving the overall coverage and effectiveness of the system. The code, runtime, system tools, libraries, and settings provide integral components for running an instance of a deployed DCAMPS-C container as a standalone, executable package within the core container technology. Furthermore, DevOps and cloud-native infrastructure integration enable seamless deployment, scaling, and management of the system, leveraging modern information technology (IT) practices and infrastructures for optimal efficiency. The DCAMPS-C orchestrator manages deployment and scalability of the encapsulated components. The DCAMPS-C orchestrator may be an instance of a Kubernetes container. The YOLAGPT LLM module includes an LLM container with the model and provides large language model capabilities for the deployed DCAMPS-C container.

The DCAMPS-C system of the present disclosure generally works by integrating the various components noted above and providing executable functionality (for step-by-step processing) that work individually and together to automate data classification and metadata generation processes, thereby simplifying deployment and management of digital assets within an organization's information technology (IT) environment. The encapsulated components of the containerization technology give rise to interactions, in an isolated environment, for running the software (DCAMPS-C container program code) consistently across different platforms and deployment environments and simplifying the deployment and scaling of the data classification and metadata publishing processes. The data classification engine (or Netwrix Data Classification engine) is configured to scan and analyze data from various sources (e.g., file servers, databases, SharePoint, cloud storage resources/providers, and/or web sources, among other possible data asset and content sources). In doing so, the data classification engine (or Netwrix Data Classification engine) utilizes customizable classification rules and policies to accurately identify, categorize, and manage sensitive information and data within the organization's IT environment. The automated metadata publishing service works in tandem with the data classification engine (or Netwrix Data Classification engine) to analyze content based on classification rules and generate relevant metadata for digital assets. By automating metadata generation, the automated metadata publishing service improves searchability, discoverability, and overall management of digital content within the organization. The customizable classification rules and policies are used by the data classification engine (or Netwrix Data Classification engine) and the automated metadata publishing service to accurately classify and categorize data based on its content and metadata. Furthermore, the customizable classification rules and policies can be predefined or user-defined according to specific needs or requirements of the organization. The data source integration allows the data classification engine (or Netwrix Data Classification engine) to connect to and scan various data sources for classification and metadata generation. Additionally, the data source integration ensures comprehensive coverage of the data landscape of the organization while also enhancing the effectiveness of the system. The code, runtime, system tools, libraries, and settings are separate components that are integrated into a unified whole within the container to ensure that any deployed DCAMPS-C container can run as a standalone, executable package. In this way, the code, runtime, system tools, libraries, and settings provide the core components for the system to function properly within the containerized environment. The DevOps and cloud-native infrastructure integration enable seamless integration with modern IT practices and infrastructures, such as continuous integration, continuous delivery, and infrastructure as code. The DevOps and cloud-native infrastructure integration also ensures efficient deployment, scaling, and management of the system within the organization's IT environment.

In some embodiments, the components of DCAMPS-C work together to create a comprehensive solution that automates data classification and metadata generation processes, streamlines deployment and scaling, and enhances overall efficiency in managing digital assets and content. The containerized nature of the system ensures consistency and seamless integration with modern IT infrastructures, ultimately providing a more effective way to manage sensitive information within an organization. In some embodiments, the underlying software-implemented process performs data classification processing to determine the appropriate classification and categorization of data based on the content and metadata. For example, if a document contains specific keywords, then it is classified as a particular category (e.g., confidential). The software-implemented process also includes several other steps, operations, sub-operations or sub-steps (also referred to as sub-routines or tasks), etc., such as scanning of data source(s), analyzing content, applying classification rules, and generating metadata. Such other steps and sub-steps are driven by an ordered process that may perform all steps in sequence or in a different order based on (in part) a programming paradigm or need-based order. For instance, many sub-routines may be functions in object classes called by a main program to execute their respective tasks and return the results (data). The functions may inevitably involve one or more decision-making algorithms which are configured to analyze the content and metadata of data sources to determine the appropriate classification based on customizable rules and policies. Furthermore, such decision-making algorithms may use machine learning or artificial intelligence (AI) techniques to improve classification accuracy over time. Metadata generation also involves a programmatic-like logic that may include the use of AI, machine learning, or pre-defined rules to analyze the content and generate relevant metadata for digital assets, thereby improving searchability and discoverability. Data source integration may have logic processing steps that involve connecting to various data sources, such as file servers, databases, SharePoint, and web sources, and retrieving data for classification and metadata generation. In order to carry out such processing steps, the data source integration may utilize one or more application programming interface(s) (APIs), authentication protocols, and/or data access methods specific to each data source. The containerization logic includes the processes and configurations required to package the software and its dependencies within a container, ensuring a consistent and isolated environment for running the software across different platforms and deployment environments. Finally, the DevOps and cloud-native infrastructure integration logic may be based on an implementation of best practices or may involve use of tools and/or workflows that enable seamless deployment, scaling, and management of DCAMPS-C in modern IT environments.

To make the DCAMPS-C system of the present disclosure, a person may develop or acquire a data classification engine (e.g., the Netwrix Data Classification engine) that is capable of identifying, categorizing, and managing sensitive information from various data sources based on customizable classification rules and policies. The person making DCAMPS-C may also develop or acquire an automated metadata publishing service that uses AI, machine learning, or pre-defined rules to analyze content and generate relevant metadata for digital assets, improving searchability and discoverability. Then the person may create (or acquire) customizable classification rules and policies (and implement them into the software) to allow organizations to accurately classify and categorize data based on their specific needs and requirements. This may be followed by developing data source integration capabilities which enable the data classification engine to connect to and scan various data sources (e.g., file servers, databases, SharePoint, and web sources). When the above are completed, the person may package the software solution, including the data classification engine, automated metadata publishing service, and all code, runtime, system tools, libraries, and settings, within a containerization technology to create a consistent and isolated environment for running the software across different platforms and deployment environments. The person may also implement DevOps and cloud-native infrastructure integration, enabling seamless deployment, scaling, and management of the software solution within modern IT environments. While optional, the person may wish to include AI and advanced machine learning algorithms for improved classification accuracy, additional data source integration, and enhanced security features.

While much focus has been placed on the Netwrix Data Classification engine, the DCAMPS-C system can be developed and deployed with an alternative data classification engine that is configured to accurately classify and categorize data based on customizable rules and policies. Similarly, alternative containerization technologies, such as Docker or Podman, could be used to create a consistent and isolated environment for running the software.

To use the DCAMPS-C system of the present disclosure, a person with a problem of inefficient management of digital assets and content within an organization's IT environment could deploy DCAMPS-C by installing the containerized DCAMPS-C software within the organization's IT infrastructure and integrating it with their existing DevOps practices and cloud-native environments. The person would also configure the data sources by setting up one or more data source integration(s), such as file servers, databases, SharePoint, and web sources, to enable the Netwrix Data Classification engine to scan and classify data from various sources within the organization. Also, the person would define, create, or otherwise acquire classification rules and policies which would be integrated and customized according to the organization's specific needs and requirements for data management, security, and compliance. Then, when the person runs data classification, the software would execute via the Netwrix Data Classification engine, which automatically scans the integrated data sources in order to identify and categorize sensitive information based on the defined rules and policies. There would utilization of the automated metadata publishing service to analyze the content based on the classification results and generate relevant metadata for digital assets, which would ultimately improve searchability, discoverability, and overall management of digital content. In using the system, the person may opt to monitor and update, on a continuous or other basis. By continuously monitoring the classification results, and updating the rules and policies as needed, the DCAMPS-C system stays up to date with changes in data protection regulations, security risks, and the organization's data management processes. Although DCAMPS-C is primarily designed for data classification and automated metadata publishing in IT environments, the system could potentially be adapted for use in different ways or in other fields of technology. For example, the underlying principles of data classification, metadata generation, and containerization could be applied to other types of data management systems, such as media asset management, product information management, or customer data management. Moreover, the containerized nature of the software allows for potential integration with various types of computers or machines that support containerization technology.

Additionally, the DCAMPS-C system can be adapted for use in different ways or in other fields of technology, including media asset management, whereby DCAMPS-C is adapted to classify and manage multimedia content, such as images, videos, and audio files, by generating metadata based on visual or auditory features, ensuring efficient organization and management of large media libraries. Similarly, DCAMPS-C could be adapted for use in product information management. When employed in managing product information (including product specifications, descriptions, and attributes), DCAMPS-C could be configured to automatically classify and generate metadata for products in e-commerce platforms, product catalogs, or supply chain systems. DCAMPS-C could be adapted for use in customer data management for classifying and managing customer data in CRM systems or marketing automation platforms, ensuring compliance with data protection regulations and facilitating personalized marketing campaigns based on customer segments and preferences. DCAMPS-C could be adapted for use in scientific data management to help classify, categorize, and manage large volumes of research data, making it more accessible and discoverable for researchers and facilitating collaboration among research teams. DCAMPS-C could be adapted for use in intellectual property management (such as patents, trademarks, and copyrights) by generating metadata based on legal and technical information, streamlining the organization and retrieval of IP assets in legal and R&D departments, etc. DCAMPS-C could be adapted for use in health records management for organizing and managing electronic health records, ensuring data privacy and compliance with health data protection regulations while improving the searchability and accessibility of patient information for healthcare providers.

Figure 1:
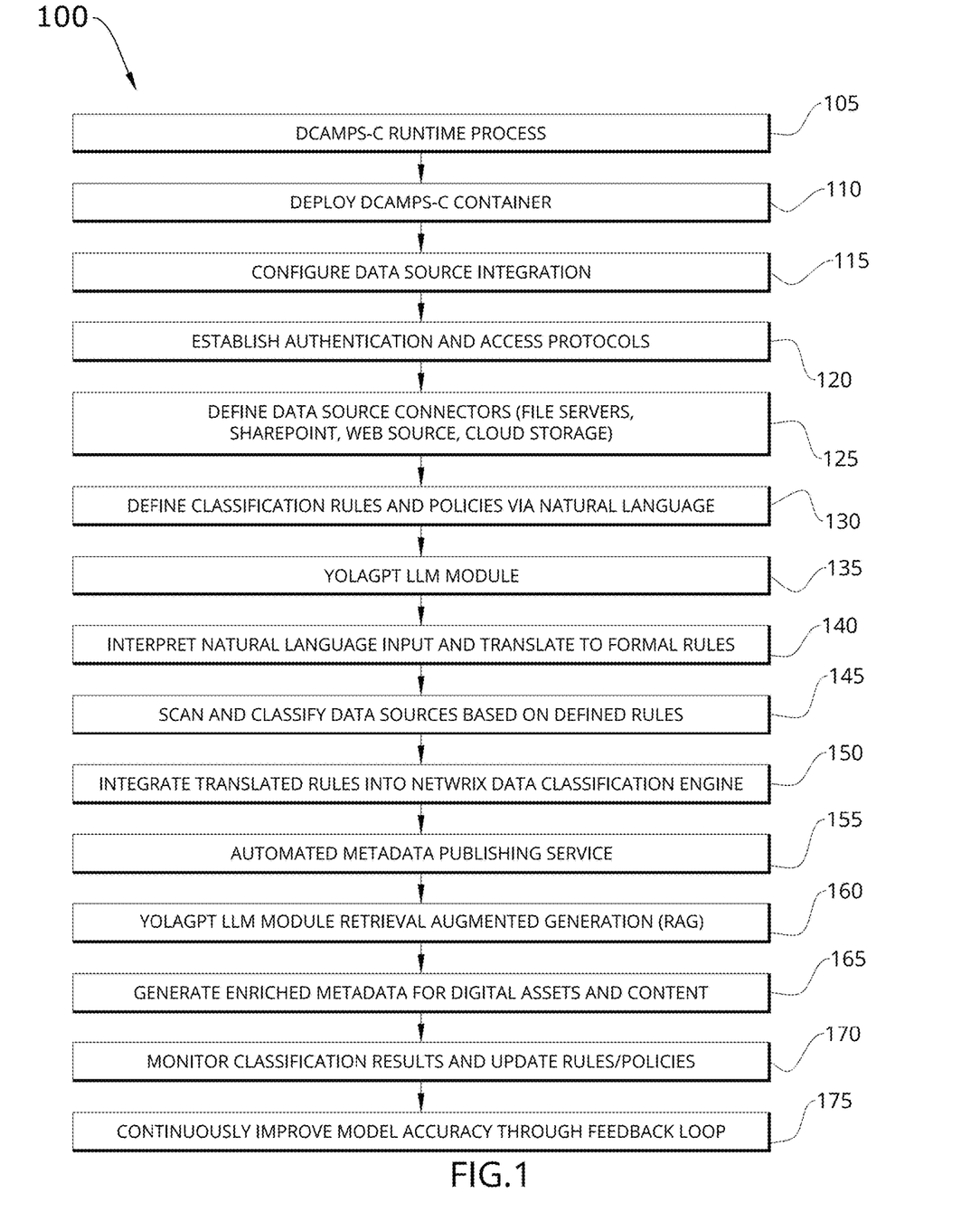
FIG. 1 conceptually illustrates a DCAMPS-C and YOLAGPT LLM module deployment, configuration, and runtime process in some embodiments.

By way of example, FIG. 1 conceptually illustrates a DCAMPS-C and YOLAGPT LLM module deployment, configuration, and runtime process 100. In some embodiments, the DCAMPS-C deployment, configuration, and runtime process 100 is performed in parts by (i) a deployment and configuration agent (or, simply, "deployment agent") configuring and deploying a DCAMPS-C container at an organization, (ii) the YOLAGPT LLM module, and (iii) an automated metadata publishing service.

The DCAMPS-C and YOLAGPT LLM module deployment, configuration, and runtime process 100 of some embodiments performs a DCAMPS-C runtime process (at 105) after a DCAMPS-C container is deployed at an organization and configured for data source integration and access/authentication to data. Thus, the DCAMPS-C and YOLAGPT LLM module deployment, configuration, and runtime process 100 includes a step for deploying (at 110) the DCAMPS-C container. After deploying the DCAMPS-C container, the DCAMPS-C and YOLAGPT LLM module deployment, configuration, and runtime process 100 moves forward to a step for configuring (at 115) a data source integration for the deployed DCAMPS-C container. The data source integration is configured to access a plurality of data sources of the organization. Next, the DCAMPS-C and YOLAGPT LLM module deployment, configuration, and runtime process 100 involves establishing authentication and access protocols (at 120). Establishing authentication and access protocols is needed to provide access to the plurality of data sources. This may involve setting up user access rights for the DCAMPS-C container and associated processes, modules, software programs, and other active components encapsulated and/or integrated into the DCAMPS-C container. After authentication and access protocols are established, the DCAMPS-C and YOLAGPT LLM module deployment, configuration, and runtime process 100 proceeds to a step for defining data source connectors that enable access to the plurality of data sources (at 125). In some embodiments, the data source connectors comprise at least one of a file server, a SharePoint source, a web source, and a cloud storage site. After defining the data source connectors, the DCAMPS-C and YOLAGPT LLM module deployment, configuration, and runtime process 100 moves on to a step for defining classification rules and policies (at 130) via natural language input. In some embodiments, this completes a DCAMPS-C deployment and configuration phase of the DCAMPS-C and YOLAGPT LLM module deployment, configuration, and runtime process 100 and allows for the DCAMPS-C runtime process to occur, which is described next in a runtime phase of the DCAMPS-C and YOLAGPT LLM module deployment, configuration, and runtime process 100.

Specifically, the runtime phase of the DCAMPS-C and YOLAGPT LLM module deployment, configuration, and runtime process 100 starts with a step for integrating (at 135) a YOLAGPT LLM module ("your optimized learning artificial-intelligence generative pre-trained transformer large language model module") into the deployed DCAMPS-C container. In some embodiments, the deployment agent may have integrated the YOLAGPT LLM module into the deployed DCAMPS-C container during the deployment and configuration phase of the DCAMPS-C and YOLAGPT LLM module deployment, configuration, and runtime process 100. Whichever phase in which the YOLAGPT LLM module is integrated into the DCAMPS-C container, the point is that once integrated, the YOLAGPT LLM module is used to interpret the classification rules and policies provided by natural language input (defined at 130). Thus, the DCAMPS-C and YOLAGPT LLM module deployment, configuration, and runtime process 100 provides the step for interpreting the natural language input and translating the interpreted natural language input into formal rules (at 140) only after the YOLAGPT LLM module is integrated (at 135) into the DCAMPS-C container. Furthermore, the YOLAGPT LLM module is the component which performs the step for interpreting the natural language input and translating the interpreted natural language input into formal rules (at 140).

Next, the DCAMPS-C and YOLAGPT LLM module deployment, configuration, and runtime process 100 proceeds to a step for scanning and classifying data sources based on defined rules (at 145). Specifically, the step for scanning and classifying (at 145) is performed by the YOLAGPT LLM module to the data sources based on the classification rules (defined at 130).

After scanning and classifying the data sources based on the defined classification rules, the DCAMPS-C and YOLAGPT LLM module deployment, configuration, and runtime process 100 moves forward to a step for integrating the translated formal rules into a data classification engine (at 150). In particular, as above, the step for integrating the translated formal rules into the data classification engine (at 150) is performed by the YOLAGPT LLM module. In some embodiments, the data classification engine into which the translated formal rules are integrated is the Netwrix data classification engine. In some other embodiments, the data classification engine into which the translated formal rules are integrated is a different data classification engine.

Next, the DCAMPS-C and YOLAGPT LLM module deployment, configuration, and runtime process 100 proceeds to a step for triggering, by the YOLAGPT LLM module, an automated metadata publishing service that is configured to perform a metadata enrichment process (at 155). In some embodiments, the automated metadata publishing service runs as a cloud service to which the deployed DCAMPS-C container for the organization has a network connection (and other DCAMPS-C containers deployed at other organizations may also access). In some embodiments, the automated metadata publishing service runs as an exclusive organization-based network service of the deployed DCAMPS-C container and accessible only to components of the DCAMPS-C container for the organization only.

After triggering the automated metadata publishing service, the DCAMPS-C and YOLAGPT LLM module deployment, configuration, and runtime process 100 proceeds to a step for combining information retrieval and language generation (at 160) through retrieval augmented generation (RAG) by the YOLAGPT LLM module. In some embodiments, the effect of combining information retrieval and language generation, through RAG by the YOLAGPT LLM module, is one that effectively retrieves and synthesizes relevant information from a curated knowledge base to produce accurate and comprehensive metadata.

Next, the DCAMPS-C and YOLAGPT LLM module deployment, configuration, and runtime process 100 proceeds to a step for generating enriched metadata for digital assets and content of the organization (at 165). Specifically, the step for generating enriched metadata for the digital assets and content is performed by the automated metadata publishing service as part of the metadata enrichment process.

After generating the enriched metadata for the digital assets and content, the DCAMPS-C and YOLAGPT LLM module deployment, configuration, and runtime process 100 proceeds to a step for monitoring (at 170) classification results and updating rules and policies as needed. In some embodiments, the DCAMPS-C container continually monitors the classification results and, when needed, updates the rules and policies. In this way, the DCAMPS-C container for the organization continuously improves model accuracy, and also improves accuracy via a feedback loop (at 175).

While the details described above, by reference to FIG. 1, demonstrate a DCAMPS-C and YOLAGPT LLM module deployment, configuration, and runtime process, other embodiments of the invention are also described. Specifically, a containerized data classification and automated metadata publishing (DCAMPS-C) system is disclosed. The DCAMPS-C system of some embodiments comprises a plurality of components. In some embodiments, the plurality of components of the DCAMPS-C system comprise (i) a data classification engine capable of classifying and categorizing data, (ii) a data source integration that enables scanning and classifying data by the data classification engine across multiple data sources, (iii) an automated metadata publishing service that adds metadata to the data assets and content scanned in the data sources, (iv) a generative pre-trained transformer large language model (LLM) module that is capable of interpreting natural language inputs made by a user, translating the user inputs into formal rules, integrating the rules into the data classification engine, and scanning and classifying data assets and content in the data sources using classification rules, and (v) a DCAMPS-C container deployed at an organization to manage sensitive data and information in an information technology (IT) environment of the organization.

In some embodiments, the data classification engine is configured to accurately classify and categorize data based on classification rules and policies that provide flexibility and accuracy in data classification for data of an organization. In some embodiments, the data classification engine is further configured to classify the data and generate metadata for data assets and content with respect to the classified data. In some embodiments, the data classification engine comprises a Netwrix Data Classification Engine.

In some embodiments, the data source integration is configured to allow the data classification engine to scan and classify data assets and content within and across a plurality of data sources of the organization. In some embodiments, the data source integration provides a crawler search bot to the data classification engine to "crawl" through the data assets and content to comprehensively scan and classify those data assets and content.

In some embodiments, the automated metadata publishing service is configured to receive the classified data and generated metadata from the data classification engine. After receiving the classified data and the generated metadata, the automated metadata publishing service of some embodiments is configured to perform a metadata enrichment process to add the metadata to the digital assets and content of the organization. In some embodiments, the automated metadata publishing service utilizes AI and machine learning during the metadata enrichment process to simplify and streamline the process of adding metadata to the data assets and content across the plurality of data sources of the organization.

In some embodiments, the generative pre-trained transformer LLM module is an optimized learning, artificial-intelligence, generative pre-trained transformer LLM module (referred to as "YOLAGPT LLM module"). In some embodiments, the YOLAGPT LLM module is configured to (i) interpret natural language input, (ii) translate the interpreted natural language input into formal rules, (iii) integrate the translated formal rules into the data classification engine, and (iv) scan and classify data assets and content across the plurality of data sources of the organization based on the classification rules.

In some embodiments, the DCAMPS-C container is deployed in an information technology (IT) environment of the organization to manage sensitive data and information for the organization. In some embodiments, the DCAMPS-C container encapsulates the data classification engine, the data source integration, the automated metadata publishing service, and the YOLAGPT LLM module. In some embodiments, encapsulation of these components within the DCAMPS-C container provides a consistent and isolated environment for runtime execution.

Figure 2:
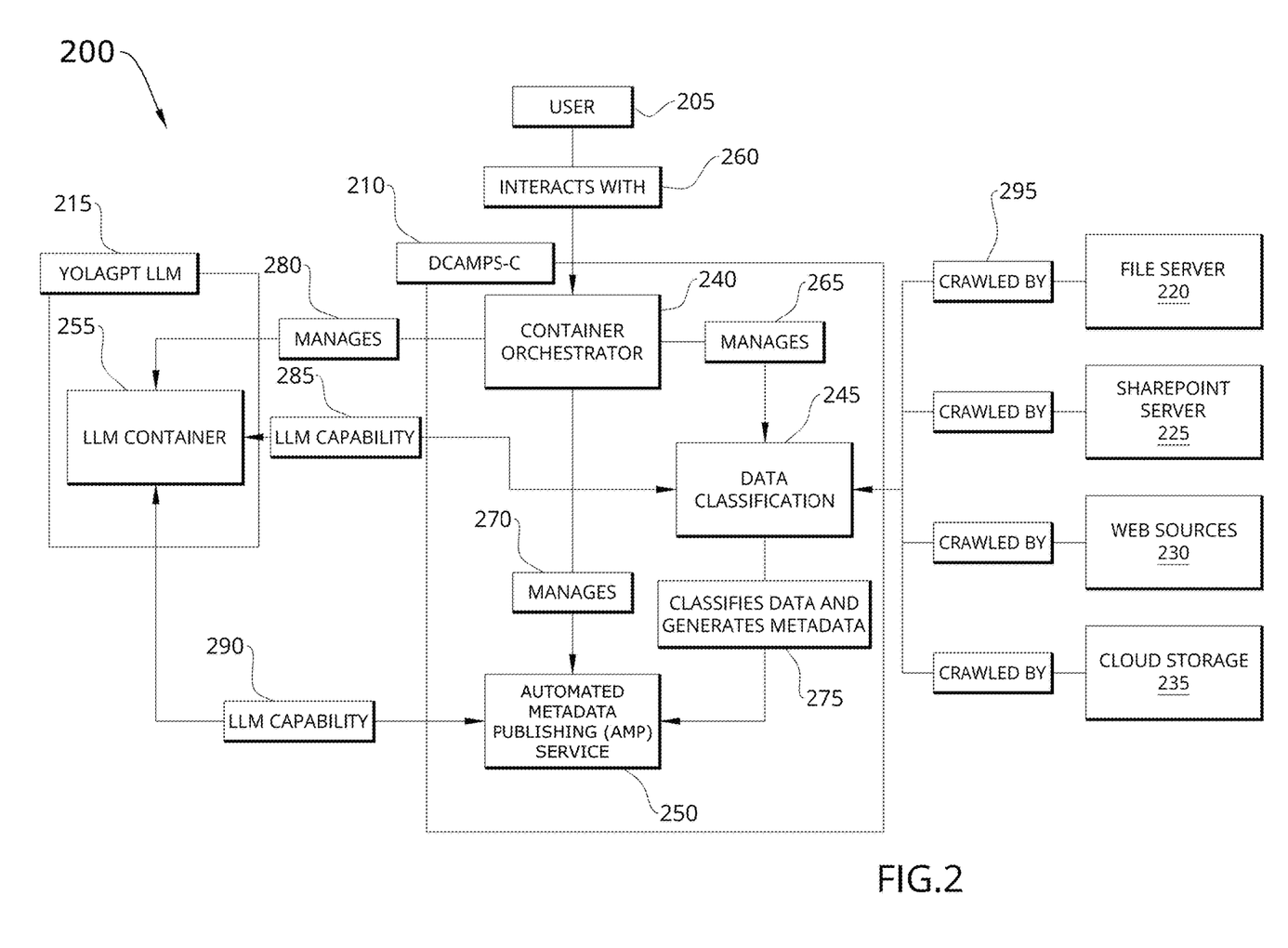
FIG. 2 conceptually illustrates a block diagram of a DCAMPS-C containerized system in some embodiments.

Now, turning to an example of a DCAMPS-C system, FIG. 2 conceptually illustrates a block diagram of a DCAMPS-C containerized system 200 (also referred to as the "DCAMPS-C system 200"). The DCAMPS-C system 200 shown in this figure includes a user (at 205), a DCAMPS-C container (at 210) deployed at an organization, a YOLAGPT LLM module (at 215) integrated into the DCAMPS-C system 200 in connection with the DCAMPS-C container (at 210), a plurality of data sources (at 220-235), a container orchestrator (at 240), a data classification engine (at 245), an automated metadata publishing service (at 250), and an LLM container (at 255).

The plurality of data sources (at 220-235) include a file server (at 220), a SharePoint server (at 225), one or more web sources (at 230), cloud storage (at 235). While this example is limited to only these data sources, a person of ordinary skill in the art would appreciate that many additional or other data sources may be accessible to the DCAMPS-C container (at 210) or any DCAMPS-C containers deployed at other organizations.

Notably, the user (at 205) is shown in this figure to demonstrate interaction with the DCAMPS-C container after deployment at an organization. However, it is noted here that this user (at 205) is not understood to be a physical component of the DCAMPS-C system or DCAMPS-C container and should not be understood as necessary for deployment and operation of the DCAMPS-C container at any organization. On the other hand, the user is typically a person, such as an employee or contractor of the organization, and has a user profile with various access rights and privileges. Thus, the user (at 205) in this example would be a user in the organization who interacts with digital assets and content which the DCAMPS-C system 200 is configured to offer highly relevant functionality to the user (at 205) and the organization by streamlining the processes of identifying, categorizing, and organizing sensitive information and data of the organization, while also providing other valuable services including, without limitation, ensuring compliance with data protection regulations and mitigating potential security risks by seamlessly integrating data classification and metadata generation over a container-based architecture that is designed to create a consistent and isolated environment for runtime execution of a deployed instance of a DCAMPS-C container.

Thus, the user (at 205) is shown in this figure as an agent of the organization who interacts with (at 260) the DCAMPS-C container (at 210). The interaction may take a variety of forms. For example, the user (at 205) may provide natural language input to the DCAMPS-C container (at 210), which is received by the container orchestrator (at 240) of the DCAMPS-C container (at 210) and is interpreted with AI-based functions, according to the respective functionality of the following additional components of the DCAMPS-C system 200.

In some embodiments, the container orchestrator (at 240) is a Kubernetes instance that manages the deployment and scaling of DCAMPS-C components. Specifically, the container orchestrator (at 240) shown in this figure is configured to manage (at 265) data classification through the data classification engine (at 245). Similarly, the container orchestrator (at 240) is also configured to manage (at 270) the automated metadata publishing service (at 250). Additionally, the container orchestrator (at 240) is also configured to manage (at 280) the LLM container (at 255).

In some embodiments, the data classification engine (at 245) is a Netwrix data classification engine that is configured to identify, categorize, and manage sensitive information and data within the IT environment of the organization in which the DCAMPS-C container is deployed. The data classification engine (at 245) has a primary role of classifying the data and generating metadata, which it then provides to the automated metadata publishing service (at 250). Furthermore, the data classification engine (at 245) is configured to crawl (at 295) the file server (at 220), the SharePoint server (at 225), the web sources (at 230), and the cloud storage (at 235) to further identify, categorize, and manage information/data among the plurality of data sources defined for the organization. In particular, the organization may add or change the data sources and re-configure the DCAMPS-C container accordingly. Nevertheless, focusing on the data sources shown in this figure, the file server (at 220) is a system that is configured to store various files and documents in the organization. The SharePoint server (at 225) is a system that is configured to manage documents and offer collaboration functions within the organization. The web sources (at 230) include various web-based data sources utilized by the organization. Finally, the cloud storage (at 235) includes cloud storage sources utilized by the organization.

In some embodiments, the LLM container (at 255) is a core component of the YOLAGPT LLM module (at 215). Specifically, the LLM container (at 255) includes the YOLAGPT large language model used to provide large language model capabilities for the DCAMPS-C system, by way of the YOLAGPT LLM module (at 215). As a core component of the YOLAGPT LLM module (at 215), the LLM container (at 255) provides this LLM capability (at 285) to the data classification engine (at 245) and also to the automated metadata publishing server (at 250). Furthermore, the LLM capabilities (at 285) and (at 290) are bi-directional, meaning that the LLM capabilities of the model of the LLM container (at 255) are impacted by the automated metadata publishing service (at 250) and the data classification engine (at 245). For example, the automated metadata publishing service (at 250) and/or the data classification engine (at 245) may have need to update classification results, rule, policies, etc., and provides the updates as training data with which to retrain the model of the LLM container (at 255).

In some embodiments, the automated metadata publishing service (at 250) is configured to simplify and streamline the process of adding metadata to the digital assets and content of the organization via AI and machine learning. In some embodiments, the automated metadata publishing service (at 250) receives data and metadata from the data classification engine (at 245). Specifically, the data received from the data classification engine (at 245) is classified and the metadata received by the data classification engine (at 245) was generated based on the classified data. Once received, however, the automated metadata publishing service (at 250) performs a metadata enrichment process to add the metadata to the digital assets and content of the organization.

The above-described embodiments of the invention are presented for purposes of illustration and not of limitation. Also, many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 3:
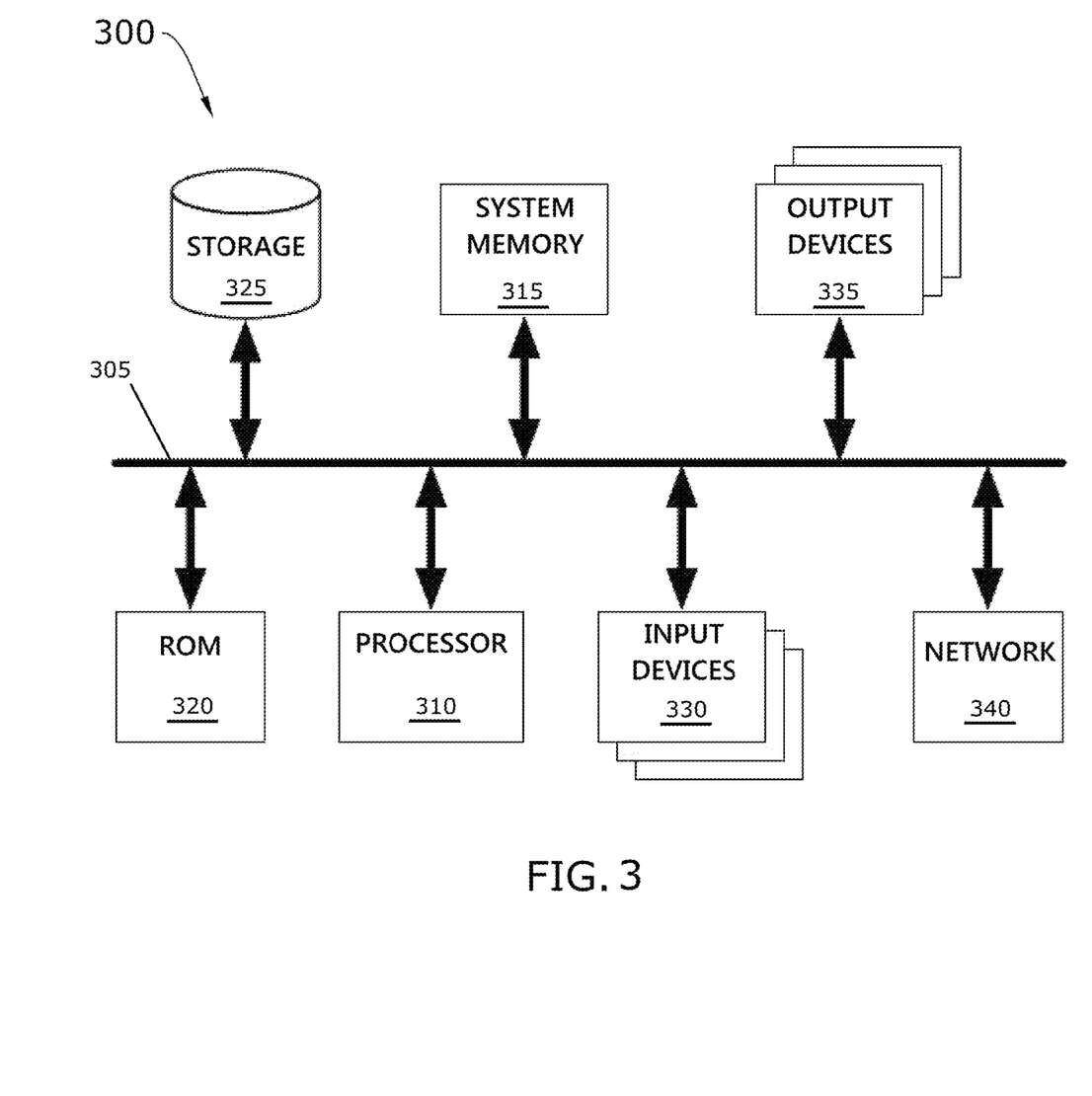
FIG. 3 conceptually illustrates an electronic system with which some embodiments of the invention are implemented.

By way of example, FIG. 3 conceptually illustrates an electronic system 300 with which some embodiments of the invention are implemented. The electronic system 300 may be a computer (desktop personal computer, or "PC", laptop, etc.), a phone (cell phone, mobile phone, smartphone, etc.), a personal digital assistant (or "PDA"), such as an iPod or another type of handheld computing device, a single board computing device (SBC), a mobile device (such as a tablet computing device, a smartphone, etc.), or any other sort of electronic device or computing device. Such an electronic system includes various types of computer readable media and interfaces for various other types of computer readable media. Specifically, as shown in this figure, the electronic system 300 includes a bus 305, processing unit(s) 310, a system memory 315, a read-only memory 320, a permanent storage device 325, input devices 330, output devices 335, and a network 340.

The bus 305 collectively represents all system, peripheral, and chipset buses that communicatively connect the numerous internal devices of the electronic system 300. For instance, the bus 305 communicatively connects the processing unit(s) 310 with the read-only memory 320, the system memory 315, and the permanent storage device 325.

From these various memory units, the processing unit(s) 310 retrieves instructions to execute and data to process in order to execute the processes of the invention. The processing unit(s) may be a single processor or a multi-core processor in different embodiments.

The read-only-memory (ROM) 320 stores static data and instructions that are needed by the processing unit(s) 310 and other modules of the electronic system. The permanent storage device 325, on the other hand, is a read-and-write memory device. This device is a non-volatile memory unit that stores instructions and data even when the electronic system 300 is off. Some embodiments of the invention use a mass-storage device (such as a magnetic or optical disk and its corresponding disk drive) as the permanent storage device 325.

Other embodiments use a removable storage device (such as a floppy disk or a flash drive) as the permanent storage device 325. Like the permanent storage device 325, the system memory 315 is a read-and-write memory device. However, unlike storage device 325, the system memory 315 is a volatile read-and-write memory, such as a random access memory. The system memory 315 stores some of the instructions and data that the processor needs at runtime. In some embodiments, the invention's processes are stored in the system memory 315, the permanent storage device 325, and/or the read-only memory 320. For example, the various memory units include instructions for interpreting natural language inputs and translating such natural language data input into formal rules, as well as instructions for scanning and classifying defined data sources based on classification rules defined prior to runtime processing of a DCAMPS-C container, integrating rules into a data classification engine, and many other actions, operations, and performance of runtime steps in accordance with some embodiments. From these various memory units, the processing unit(s) 310 retrieves instructions to execute and data to process in order to execute the processes of some embodiments.

The bus 305 also connects to the input and output devices 330 and 335. The input devices enable an end user to communicate information and select commands to the electronic system. For instance, the user may provide natural language input through a keyboard that is thus interpreted and translated by the YOLAGPT LLM module integration of the DCAMPS-C container. Examples of such input devices 330 include, without limitation, physical and virtual alphanumeric keyboards, audible voice assistant devices, and pointing devices (also called "cursor control devices"), among others. The output devices 335 display information generated by the electronic system 300, which may be textual in nature (alphanumeric text information) or graphical in nature (e.g., images, graphics, interface elements and components, etc.). Examples of such output devices 335 include, without limitation, printers and display devices, such as cathode ray tube (CRT) screens, liquid crystal displays (LCD), and organic light emitting diode (OLED) displays, among others. Some embodiments include devices such as a touchscreen that functions as both input and output devices.

Finally, as shown in FIG. 3, the bus 305 also couples electronic system 300 to a network 340 through a network adapter (not shown). In this manner, the computer can be a part of a network of computers (such as a local area network ("LAN"), a wide area network ("WAN"), or an intranet), or a network of networks (such as the Internet). Any or all components of electronic system 300 may be used in conjunction with the invention. Thus, the file servers, SharePoint server, web sources, and cloud storage components described above, by reference to FIG. 2, may be accessible remotely (away from the organization) through a network connection to a corresponding cloud application service or other cloud-based or web resource provider.

These functions described above can be implemented in digital electronic circuitry, in computer software, firmware or hardware. The techniques can be implemented using one or more computer program products. Programmable processors and computers can be packaged or included in mobile devices or conventional computing devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIG. 1 conceptually illustrates a process in which the specific operations of the process may not be performed in the exact order shown and described. Specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A containerized data classification and automated metadata publishing (DCAMPS-C) system comprising:
    a data classification engine capable of accurately classifying and categorizing data based on classification rules and policies that provide flexibility and accuracy in data classification for data of an organization, the data classification engine is further configured to classify the data ("classified data") and generate metadata for the classified data;
    a data source integration that is configured to allow the data classification engine to scan and classify data across a plurality of data sources of the organization;
    an automated metadata publishing service that is configured to (i) receive the classified data and generated metadata from the data classification engine and (ii) perform a metadata enrichment process to add the metadata to the digital assets and content of the organization;
    an optimized learning, artificial-intelligence generative pre-trained transformer (YOLAGPT) large language model (LLM) module that is configured to (i) interpret natural language input, (ii) translate the interpreted natural language input into formal rules, (iii) integrate the translated formal rules into the data classification engine, and (iv) scan and classify data assets and content across the plurality of data sources of the organization based on the classification rules; and
    a DCAMPS-C container deployed at an organization to manage sensitive data and information in an information technology (IT) environment of the organization, wherein the DCAMPS-C container (i) encapsulates the data classification engine, the data source integration, the automated metadata publishing service, and the YOLAGPT LLM module and (ii) provides a consistent and isolated environment for runtime execution.

2. The DCAMPS-C system of claim 1, wherein the data classification engine comprises a Netwrix data classification engine.

3. The DCAMPS-C system of claim 1, wherein the plurality of data sources comprise at least one of a file server, a SharePoint server, a web source, and a cloud storage.

4. The DCAMPS-C system of claim 1, wherein the YOLAGPT LLM module is further configured to combine information retrieval and language generation.

5. The DCAMPS-C system of claim 4, wherein the YOLAGPT LLM module combines information retrieval and language generation via a retrieval augmented generation (RAG) process.

6. The DCAMPS-C system of claim 5, wherein utilizing RAG to combine information retrieval and language generation enables the YOLAGPT LLM module to produce accurate and comprehensive metadata for the data assets and content.

7. The DCAMPS-C system of claim 1 further comprising a data orchestrator of the DCAMPS-C container that is configured to manage (i) deployment of the DCAMPS-C container and (ii) scaling of the data classification engine, the automated publishing service, and the YOLAGPT LLM module.

8. The DCAMPS-C system of claim 7, wherein the data orchestrator comprises a Kubernetes container.

9. A containerized data classification and automated metadata publishing (DCAMPS-C) and your optimized learning artificial-intelligence generative pre-trained transformer (YOLAGPT) large language model (LLM) module deployment, configuration, and runtime process comprising:
   deploying a DCAMPS-C container at an organization;
   configuring a data source integration for access to a plurality of data sources of the organization;
   establishing authentication and access protocols;
   defining data source connectors that enable access to the plurality of data sources;
   defining classification rules and policies via natural language input;
   integrating a YOLAGPT LLM module into the DCAMPS-C container to start a DCAMPS-C runtime process;
   interpreting, by the YOLAGPT LLM module, the natural language input and translating the interpreted natural language input into formal rules;
   scanning and classifying, by the YOLAGPT LLM module, data sources based on the defined classification rules;
   integrating, by the YOLAGPT LLM module, the translated formal rules into a data classification engine;
   combining information retrieval and language generation, via retrieval augmented generation (RAG) accessed by the YOLAGPT LLM module, to produce accurate and comprehensive metadata; and
   generating, by an automated metadata publishing service performing a metadata enrichment process, enriched metadata for digital assets and content of the organization.

10. The DCAMPS-C and YOLAGPT LLM module deployment, configuration, and runtime process of claim 9 further comprising monitoring classification results and updating rules and policies.

11. The DCAMPS-C and YOLAGPT LLM module deployment, configuration, and runtime process of claim 10 further comprising continuously improving accuracy of the LLM through a feedback loop.

12. The DCAMPS-C and YOLAGPT LLM module deployment, configuration, and runtime process of claim 9, wherein the deploying, configuring, establishing, defining data source connectors, and defining classification rules and policies are performed by a deployment agent deploying the DCAMPS-C container and preparing for the start of the DCAMPS-C runtime process.

13. The DCAMPS-C and YOLAGPT LLM module deployment, configuration, and runtime process of claim 9, wherein the data classification engine is a Netwrix data classification engine.

14. The DCAMPS-C and YOLAGPT LLM module deployment, configuration, and runtime process of claim 9 further comprising triggering, by the YOLAGPT LLM module, the automated metadata publishing service to perform the metadata enrichment process.

15. The DCAMPS-C and YOLAGPT LLM module deployment, configuration, and runtime process of claim 9, wherein by RAG effectively retrieves and synthesizes relevant information from a curated knowledge base.

* * * * *